(12) United States Patent
Kim et al.

(10) Patent No.: US 12,451,261 B2
(45) Date of Patent: Oct. 21, 2025

(54) APPARATUS FOR DETECTING NUCLEAR REACTOR COOLANT LEAKS

(71) Applicants: IUCF-HYU (INDUSTRY-UNIVERSITY COOPERATION FOUNDATION HANYANG UNIVERSITY), Seoul (KR); KOREA ATOMIC ENERGY RESEARCH INSTITUTE, Deajeon (KR)

(72) Inventors: Yong Kyun Kim, Sejong-si (KR); Tae Soon Kwon, Daejeon (KR); Sang Min Lee, Seoul (KR); Ki Hong Pak, Seoul (KR); Jong Heon Kim, Seoul (KR); Young Sik Cho, Sejong-si (KR)

(73) Assignees: IUCF-HYU (INDUSTRY-UNIVERSITY COOPERATION FOUNDATION HANYANG UNIVERSITY), Seoul (KR); KOREA ATOMIC ENERGY RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/581,277

(22) Filed: Jan. 21, 2022

(65) Prior Publication Data

US 2023/0081538 A1    Mar. 16, 2023

(30) Foreign Application Priority Data

Sep. 9, 2021    (KR) .......................... 10-2021-0120266

(51) Int. Cl.
*G21C 17/00*    (2006.01)
(52) U.S. Cl.
CPC .................................. *G21C 17/002* (2013.01)

(58) Field of Classification Search
CPC .................................................... G21C 17/002
(Continued)

(56) References Cited

U.S. PATENT DOCUMENTS

| 2,961,543 A | * | 11/1960 | Hauck | G21C 17/022 |
| | | | | 376/245 |
| 3,293,434 A | * | 12/1966 | Dexter | G21C 17/044 |
| | | | | 376/250 |
| 9,268,034 B2 | * | 2/2016 | Nishimura | G21C 17/02 |

FOREIGN PATENT DOCUMENTS

| JP | 2008-96345 A | 4/2008 |
| KR | 10-2014-0122962 A | 10/2014 |

(Continued)

OTHER PUBLICATIONS

Kitaguchi, "Silicon semiconductor detectors for various nuclear radiations", IEEE Transactions on Nuclear Science 43, No. 3 (1996): 1846-1850. (Year: 1996).*

(Continued)

*Primary Examiner* — Jack W Keith
*Assistant Examiner* — Daniel Wasil
(74) *Attorney, Agent, or Firm* — Sughrue Mion, PLLC (57) ABSTRACT

The present disclosure relates to an apparatus for detecting nuclear reactor coolant leaks that is capable of maintaining radiation detection reliability and the integrity of a radiation detector from high-dose background radiation inside a nuclear reactor when a coolant leaks from the primary coolant system of the nuclear reactor. The apparatus of the present disclosure includes a shield having an internal space into which sample air containing a coolant leaking from a primary coolant system pipe of a nuclear reactor is introduced. The shield is configured to close the exposed internal space or expand the internal space through detachable coupling. The apparatus of the present disclosure further includes a first sensor disposed in the internal space to obtain (Continued)

a radiation measurement signal from the sample air. The apparatus of the present disclosure further includes a discriminator for determining whether a coolant is leaking based on the radiation measurement signal.

12 Claims, 7 Drawing Sheets

(58) Field of Classification Search
USPC .......................................................... 376/250
See application file for complete search history.

(56) References Cited

FOREIGN PATENT DOCUMENTS

| KR | 10-1648395 B1 | 8/2016 |
| KR | 10-1724383 B1 | 4/2017 |
| KR | 10-1864716 B1 | 6/2018 |

OTHER PUBLICATIONS

Korean Office Action dated Dec. 7, 2022 in Korean Application No. 10-2021-0120266.

* cited by examiner

APPARATUS FOR DETECTING NUCLEAR REACTOR COOLANT LEAKS

CROSS-REFERENCE TO RELATED APPLICATION

This application claims priority to Korean Patent Application No. 10-2021-0120266, filed on Sep. 9, 2021 in the Korean Intellectual Property Office, the disclosure of which is incorporated herein by reference.

BACKGROUND OF THE DISCLOSURE

Field of the Disclosure

The present disclosure relates to an apparatus for detecting nuclear reactor coolant leaks and a method of detecting nuclear reactor coolant leaks using the same. More particularly, the present disclosure relates to an apparatus for detecting nuclear reactor coolant leaks that is capable of maintaining radiation detection reliability and the integrity of a radiation detector from high-dose background radiation inside a nuclear reactor when a coolant leaks from the primary coolant system of the nuclear reactor; and a method of detecting nuclear reactor coolant leaks using the apparatus of the present disclosure.

Description of the Related Art

In general, a nuclear reactor coolant system (RCS) is a means for transferring heat from a primary coolant to a secondary coolant. This cooling system removes heat from a reactor core, thereby ensuring nuclear fuel integrity in the event of a nuclear accident. Since a loss-of-coolant accident (LOCA) in a coolant system causes serious accidents such as melting of nuclear fuel and leakage of radioactive materials, early detection of coolant leaks is very important.

According to a leak detection method applied to a nuclear reactor in a nuclear power plant, using mass deviation according to change in humidity inside a containment building, measurement of radioactivity in the air inside the containment building, and change in water level in a sump installed at the bottom of the containment building, coolant leaks are monitored with a detection performance of 1 gpm/hr. In addition, in nuclear reactors currently in operation, a small amount of reactor coolant leaks due to aging, and the amount of leakage is gradually increasing. In particular, since cracks generated in piping connected to a coolant system grow rapidly, early detection of coolant leaks is very important.

Although primary and secondary coolant systems constituting a nuclear reactor coolant system are independent, rupture of the U-tube of a steam generator may cause nuclear reactor coolant leaks between the primary and secondary coolant systems. In this case, a BGO scintillator detector is used to detect coolant leaks. The BGO scintillator detector installed near a main streamline (MSL) detects gamma rays emitted from $^{16}N$, which accounts for a significant amount of radionuclides generated by neutron radiation from a nuclear reactor vessel. Through this, it can be determined whether there is a leak between the primary and secondary coolant systems.

According to leak detection technology in the primary coolant system of nuclear power plants currently used, each containment building is monitored for coolant leaks. Accordingly, when a small amount of leakage occurs, time required to detect the leakage is significantly increased due to various causes such as phase change and condensation of vapor. In addition, when a technique suitable for a large leakage is applied to a small leakage, the area of the sump of a containment building is increased, and the degree of change in water level in the sump is very small in case of a small leakage. Accordingly, in this case, leakage detection time is increased. In addition, it is impossible to detect a small leakage without change in the level of atmospheric radiation in a containment building. Another problem is that vapors may condense before vapors reach an atmospheric humidity meter inside the containment building. In addition, $^{16}N$ gamma-ray detection technology can be applied only to a specific situation of leak monitoring between primary and secondary coolant systems, so the scope of the use of the above technology is limited. In addition, since the half-life of $^{16}N$ is short as about 7.1 seconds, when the radionuclides reach a steam generator, the concentration of the radionuclides is greatly reduced. Accordingly, significant detection performance is required. Therefore, the above technique cannot be applied to detect small, unconfirmed leaks occurring inside nuclear power plants.

This work was supported by Korea Institute of Energy Technology Evaluation and Planning (KETEP) grant funded by the Korea government (MOTIE) (No. 20181510102340, Development of a real time detection system for unidentified RCS leakage less than 0.5 gpm).

RELATED ART DOCUMENTS

Patent Documents

Korean Patent No. 10-1648395
Korean Patent No. 10-1864716

SUMMARY OF THE DISCLOSURE

Therefore, the present disclosure has been made in view of the above problems, and it is an object of the present disclosure to provide technology that secures the reliability of determining whether a coolant is leaking by collecting sample air when a coolant leaks from the primary coolant system of a nuclear reactor and detecting a radiation measurement signal contained in the coolant within a shielding structure, maintains integrity by frequently monitoring a radiation measuring device, and improves the reliability of determining whether a coolant is leaking by using additional information.

In accordance with one aspect of the present disclosure, provided is an apparatus for detecting nuclear reactor coolant leaks including a shield having an internal space into which sample air containing a coolant leaking from a primary coolant system pipe of a nuclear reactor is introduced, and configured to close the exposed internal space or expand the internal space through detachable coupling; a first sensor disposed in the internal space to obtain a radiation measurement signal from the sample air; and a discriminator for determining whether a coolant is leaking based on the radiation measurement signal.

According to one embodiment of the present disclosure, in the internal space, a space into which the sample air is introduced and a space in which the first sensor is disposed may be physically separated.

In addition, according to one embodiment of the present disclosure, the shield may include bodies each having an opening formed on one side thereof; and body closing barriers for closing the openings.

In addition, according to one embodiment of the present disclosure, the bodies may be provided in plural, and a stepped structure may be formed at one end of each of the bodies so that the bodies are coupled to each other via a stepped structure-mediated manner.

In addition, according to one embodiment of the present disclosure, a stepped structure may be formed at one end of each of the bodies so that the bodies are coupled to the body closing barriers via a stepped structure-mediated manner.

In addition, according to one embodiment of the present disclosure, the shield may include an inlet pipe through which the sample air is introduced into the internal space; and a discharge pipe through which the sample air located in the internal space is discharged outside.

In addition, according to one embodiment of the present disclosure, the first sensor may include a detector for detecting radiation; and an inspector for monitoring radiation detection performance of the detector.

In addition, according to one embodiment of the present disclosure, the detector may be a semiconductor detector that satisfies radiation resistance test conditions.

In addition, according to one embodiment of the present disclosure, the inspector may include a rod; a driver for driving the rod; and a check source formed on the rod to radiate radiation.

In addition, according to one embodiment of the present disclosure, the driver may be a solenoid actuator, and the check source is capable of moving between a monitoring position and a monitoring release position of the detector according to power on/off.

In addition, according to one embodiment of the present disclosure, the apparatus may further include a second sensor configured to detect additional information about the sample air so that the discriminator determines whether a coolant leaks.

In addition, according to one embodiment of the present disclosure, the second sensor may include a sensor for sensing temperature or humidity information of the sample air; and a transmitter located in the internal space to convert information of the sensor into an electrical signal.

In addition, according to one embodiment of the present disclosure, the internal space may include first to third spaces physically separated from each other, the first sensor may be disposed in the first space, the second space may be a space into which the sample air is introduced, and the transmitter may be disposed in the third space.

In accordance with another aspect of the present disclosure, provided is an apparatus for detecting nuclear reactor coolant leaks including a shield having an internal space into which sample air containing a coolant leaking from a primary coolant system pipe of a nuclear reactor is introduced; a first sensor disposed in the internal space to obtain a radiation measurement signal from the sample air and provided with a means for monitoring radiation detection performance; and a discriminator for determining whether a coolant is leaking based on the radiation measurement signal.

In addition, according to one embodiment of the present disclosure, the first sensor may include a detector for detecting radiation; and an inspector for monitoring radiation detection performance of the detector.

In addition, according to one embodiment of the present disclosure, the inspector may include a rod; a driver for driving the rod; and a check source formed on the rod to radiate radiation.

In accordance with yet another aspect of the present disclosure, provided is a method of detecting nuclear reactor coolant leaks, the method including a suction step of sucking a coolant leaked from a primary coolant system pipe of a nuclear reactor into sample air; a collection step of collecting the sample air sucked in the suction step into a shielded space; a first detection step of detecting a radiation measurement signal from the sample air collected in the collection step; a second detection step of detecting additional information necessary to determine whether a coolant leaks from the sample air sucked in the suction step; and a determination step for determining, based on the radiation measurement signal and the additional information, whether the coolant leaks.

In addition, according to one embodiment of the present disclosure, the method may further include a monitoring step of monitoring radiation detection performance of a radiation measuring device operating in the first detection step.

In addition, according to one embodiment of the present disclosure, the additional information may be temperature or humidity information of the sample air.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION OF THE DISCLOSURE

Hereinafter, with reference to the accompanying drawings, an apparatus for detecting nuclear reactor coolant leaks and a method of detecting nuclear reactor coolant leaks using the same will be described in detail as follows. In this specification, the same or similar elements are designated by the same reference numerals. In addition, detailed description of known functions and configurations incorporated herein will be omitted when it may make the subject matter of the present disclosure unclear. Embodiments of the present disclosure are provided to more fully describe the present disclosure to those skilled in the art. Accordingly, the shapes and sizes of elements in the drawings may be exaggerated for clearer description.

<Apparatus for Detecting Nuclear Reactor Coolant Leaks>

Figure 1:
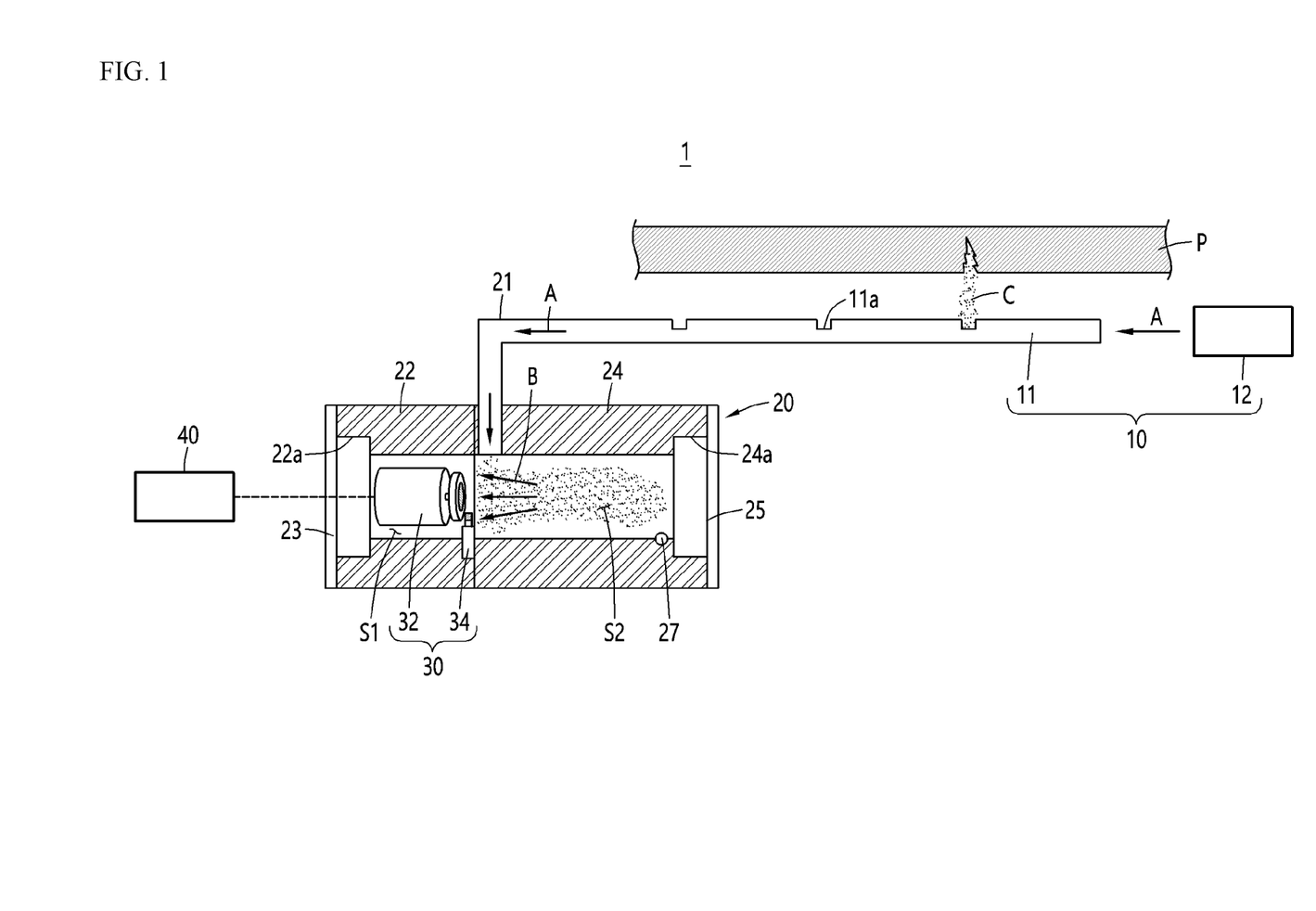
FIG. 1 schematically illustrates the configuration of an apparatus for detecting nuclear reactor coolant leaks according to one embodiment of the present disclosure.
Figure 2:
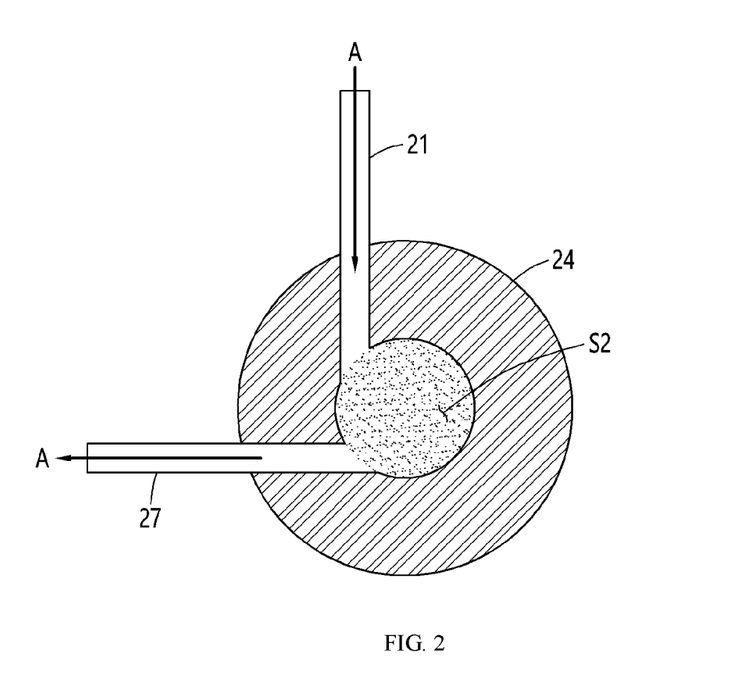
FIG. 2 is a cross-sectional view of an apparatus for detecting nuclear reactor coolant leaks according to one embodiment of the present disclosure.
Figure 3:
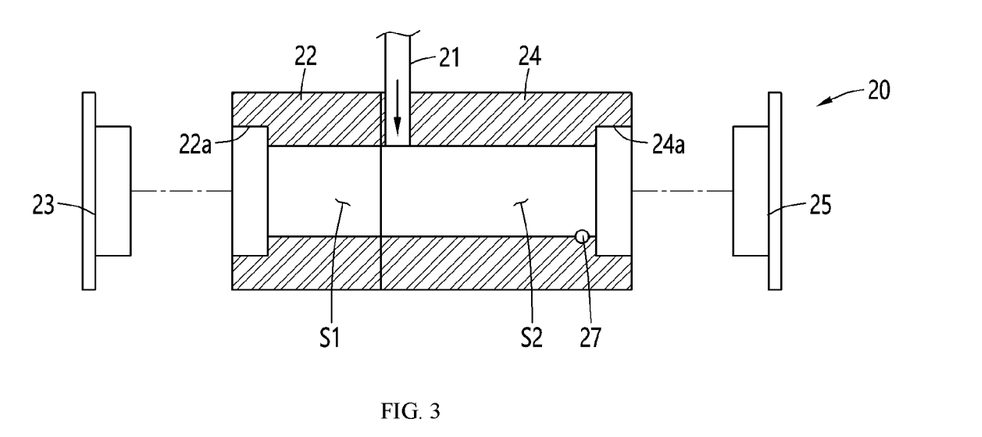
FIG. 3 shows the configuration of a shield according to one embodiment of the present disclosure.

FIG. 1 schematically illustrates the configuration of an apparatus for detecting nuclear reactor coolant leaks according to one embodiment of the present disclosure, FIG. 2 is a cross-sectional view of an apparatus for detecting nuclear reactor coolant leaks according to one embodiment of the present disclosure, and FIG. 3 shows the configuration of a shield according to one embodiment of the present disclosure.

As shown in FIG. 1, an apparatus 1 for detecting nuclear reactor coolant leaks according to one embodiment of the present disclosure includes a sucker 10, a shield 20, a first sensor 30, and a discriminator 40.

For reference, the apparatus 1 for detecting nuclear reactor coolant leaks according to one embodiment of the present disclosure detects leaks in the primary coolant system of a nuclear reactor (not shown) generating nuclear reaction, such as a nuclear power plant. More specifically, the apparatus 1 for detecting nuclear reactor coolant leaks according to one embodiment of the present disclosure detects leakage of a coolant (C) in the primary coolant system of a nuclear reactor located inside a containment facility such as a sump or a containment building and at the same time, detects leakage of the coolant (C) inside the containment facility. That is, according to the present disclosure, it is determined whether the coolant (C) is leaking from the inside rather than the outside of a containment facility.

In addition, the apparatus 1 for detecting nuclear reactor coolant leaks according to one embodiment of the present disclosure measures beta rays of $^{16}N$, which account for a significant amount of radionuclides generated when leaking from a primary coolant system, and evaluates whether the primary coolant system located in an isolation facility such as a containment building is leaking. However, the apparatus 1 for detecting nuclear reactor coolant leaks described in the present disclosure is not limited to detecting only $^{16}N$ among radionuclides, and the type of radionuclide is not a limitation of the present disclosure.

The sucker 10 is disposed in the same space as a primary coolant system pipe (P) of a nuclear reactor (not shown). In this case, the sucker 10 is disposed adjacent to the primary coolant system pipe (P). The sucker 10 sucks the coolant (C) leaked from the primary coolant system pipe (P) into sample air (A). For this function, the sucker 10 includes a collection pipe 11 and an air injector 12, and sucks the high-humidity sample air (A) generated by vaporizing the coolant (C) such as a coolant.

For reference, the sucker 10 is not separately provided outside of an isolation facility such as a containment building in which the primary coolant system pipe (P) of a nuclear reactor is located, but is located inside the isolation facility.

The collection pipe 11 is provided to be located in the same space as the primary coolant system pipe (P). The collection pipe 11 may be provided to be parallel to the primary coolant system pipe (P), and may be provided in a porous or valve type.

In the present embodiment, a plurality of collection holes 11a are formed on the outer peripheral surface of the collection pipe 11 in the longitudinal direction thereof. In this case, a time difference for the sample air (A) to reach the shield 20 is generated according to the locations of the collection holes 11a, so that a count rate at the time of detecting beta rays (B) of $^{16}N$ radiation is changed. By using change in a count rate according to the locations of the collection holes 11a, the leakage location of the coolant (C) of the primary coolant system pipe (P) may be confirmed.

For reference, the collection pipe 11 may be located between the primary coolant system pipe (P) and an insulator (not shown).

The air injector 12 injects the sample air (A) into the collection pipe 11. Here, the air injector 12 is an air sampler that generates air and injects the generated air into the collection pipe 11.

The shield 20 is a containment structure having an internal space. The shield 20 consists of a metal partition wall capable of shielding radiation. For example, the shield 20 may be made of a shielding material such as lead (Pb) capable of shielding radiation. According to another embodiment, a shielding member (not shown) capable of shielding radiation may be further formed along the inner wall of the shield 20. Accordingly, background radiation in a nuclear reactor is difficult to penetrate into the internal space of the shield 20, and radiation introduced into the internal space of the shield 20 is difficult to be exposed to the outside.

Referring to FIG. 2, according to one embodiment of the present disclosure, the shield 20 has a hollow cylindrical shape. However, in another embodiment, the shield 20 have various shapes, such as a polygonal pole having an internal space.

In the shield 20, an inlet pipe 21 through which the sample air (A) sucked by the sucker 10 flows into the internal space of the shield 20 is formed. The inlet pipe 21 is connected to the collection pipe 11. In the shield 20, a discharge pipe 27 through which the sample air (A) located in the internal space of the shield 20 is discharged to the outside is formed. An air pump (not shown) for circulating the sample air (A) into and out of the shield 20 may be further formed in the discharge pipe 27. Accordingly, the sample air (A) introduced into the internal space of the shield 20 through the inlet pipe 21 may be discharged to the outside through the discharge pipe 27. The discharge pipe 27 is located in the lower portion to facilitate discharge of condensed water that may be formed by the sample air (A) introduced into the internal space.

The shield 20 includes a first body 22 and a second body 24. An internal space (S1) of the first body 22 and an internal space (S2) of the second body 24 are physically separated. The internal space (S1) of the first body 22 is a space in which the first sensor 30 to be described later is disposed, and the internal space (S2) of the second body 24 is a space into which the sample air (A) is introduced. When the first sensor 30 and the sample air (A) are physically separated in this way, the first sensor 30 may be prevented from being physically or chemically damaged by a leaking coolant containing radionuclides, and the radiation signal of a leaking coolant containing radionuclides may be efficiently detected without contact between a detector 32 to be described later and coolant vapor.

As shown in FIGS. 1 and 3, openings are formed in one side of the first body 22 (the left side of the first body shown in FIG. 3) and the other side of the second body 24 (the right side of the second body shown in FIG. 3), respectively. The internal space (S1) may be exposed by the opening formed in one side of the first body 22, and the internal space (S2) may be exposed by the opening formed in the other side of the second body 24.

The opening formed in one side of the first body 22 is closed by a first body closing barrier 23, and the opening formed in the other side of the second body 24 is closed by a second body closing barrier 25. Joint portions where the first body 22 and the second body 24 are in contact with the first body closing barrier 23 and the second body closing barrier 25, respectively, may be implemented in various joint types, such as a screw-type joint and a protrusion-type joint. The joint portions may be sealed by a sealing material.

As shown in FIGS. 1 and 3, according to one embodiment of the present disclosure, stepped structures 22a and 24a are formed at one end of the first body 22 and the other end of the second body 24, respectively. In this case, the first body closing barrier 23 and the second body closing barrier 25 have shapes that fit into the stepped structures 22a and 24a, respectively, and are coupled to the first body 22 and the second body 24 via a stepped structure-mediated manner, respectively. In FIGS. 1 and 3, one stepped structure 22a is formed in the body 22 and one stepped structure 24a is formed in the body 24, but as will be described later, the number of stepped structures is not limited. When the stepped structures 22a and 24a are formed in this way, background radiation in a nuclear reactor is difficult to penetrate into the internal space of the shield 20, and radiation inside the shield 20 is difficult to be exposed to the outside.

The first sensor 30 serves to accurately detect the radiation of the sample air (A) introduced into the internal space of the shield 20, and includes the detector 32 and an inspector 34.

The first sensor 30 is introduced through the opening formed in one side of the first body 22, and then the opening is closed by the first body closing barrier 23. Accordingly, the first sensor 30 may accurately detect radiation from the sample air (A) introduced into the second space (S2) without being affected by background radiation in a nuclear reactor.

The detector 32 detects the beta rays (B) of $^{16}$N radiation from the sample air (A) introduced into the second space (S2) of the internal space of the shield 20. However, there is no limitation on the types of radionuclides and radiations detected by the detector 32.

Preferably, the detector 32 has a radiation-resistant performance, and has excellent performance in detecting charged particles such as alpha rays and beta rays of radionuclides. In particular, the detector 32 preferably consists of a detector that satisfies certain performance test conditions so as to maintain integrity for performance in a high-dose radiation environment such as a radiation resistance test, but the type of the detector 32 is not limited.

In one embodiment of the present disclosure, the detector 32 consists of a silicon semiconductor detector. The semiconductor detector includes a beta-ray preamplifier (preamp) and an amplifier (amp) that amplify an electrical signal generated by ionization by radiation in a depletion region in a semiconductor, and may be provided with a power supply for independent operation. In addition, the detector 32 may include a signal processing device, such as a multichannel analyzer (MCA), for processing the output signal of a beta-ray amplifier.

Figure 4:
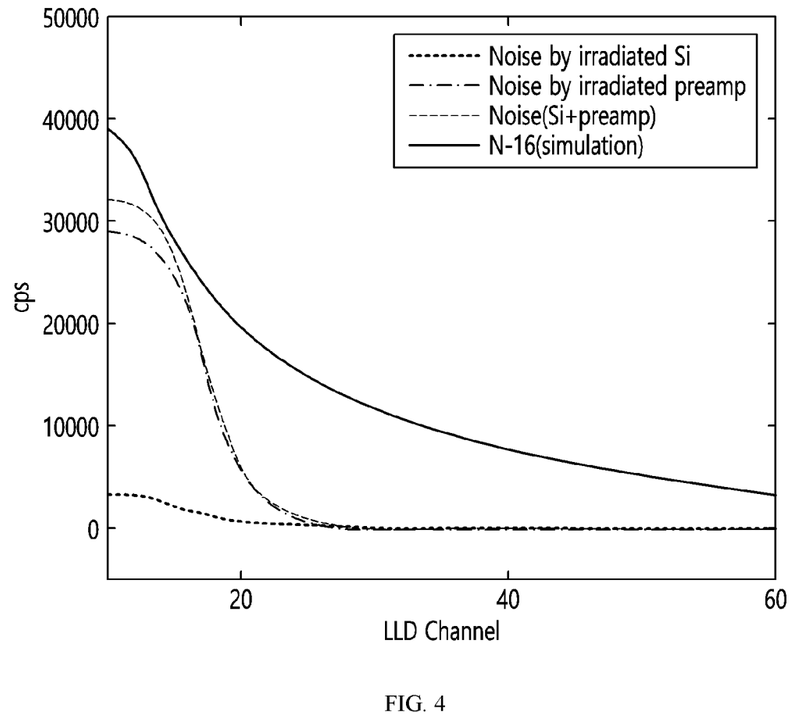
FIG. 4 is a graph showing the radiation resistance test results of a detector according to one embodiment of the present disclosure.

FIG. 4 is a graph showing the radiation resistance test results of a detector according to one embodiment of the present disclosure. In the graph of FIG. 4, the horizontal axis represents the channel position of a lower level discriminator, and the vertical axis represents count rates (signal generation rate, cps).

As described above, the detector 32 according to one embodiment of the present disclosure must satisfy certain radiation resistance test conditions so that the integrity thereof is maintained even in a high-dose radiation environment.

The test performed in FIG. 4 is as follows. A silicon semiconductor detector and a preamplifier were placed in a 5 cm thick lead shielding structure, and then were irradiated with gamma rays emitted from the radionuclide Co-60. Irradiation of a total absorbed dose (1 to 1.34 kGy) expected to accumulate over 60 years (design lifespan of nuclear power plant furnace type APR1400) at a design dose rate of 10 mSv/hr in the shielding structure where the detection system is installed was performed. By measuring alpha rays, which are the same type as a check source installed in the detection system, the functional integrity of the detection system before, during, and after cumulative dose irradiation was verified. The reliability of a detection signal may be ensured by setting the position of a lower level discriminator (LLD) where there is no change in signal generation rate before and after the irradiation test. This is because the signal generation rate of channels lower than the lower level discriminator changes as dose accumulates.

In the graph of FIG. 4, a signal (N-16) by $^{16}$N radiation, a noise signal (Noise by irradiated Si) by a silicon semiconductor exposed to radiation, a noise signal (Noise by irradiated preamp) by a preamplifier exposed to radiation, and a sum of the noise signals (Noise(Si+preamp)) are shown. The signal by $^{16}$N radiation is a simulated signal expected when a coolant leak of 0.5 gpm has occurred in the apparatus 1 for detecting nuclear reactor coolant leaks according to one embodiment of the present disclosure. In the graph of FIG. 4, each signal is shown in counts per second that change according to lower level discriminator (LLD) setting. The lower level discriminator will be described later.

According to the test results performed in FIG. 4, when a lower level discriminator (LLD) is set at a point where a signal (N-16) by $^{16}$N radiation and a sum of noise signals (Noise(Si+preamp)) are the maximum, the reliability of a detection signal may be guaranteed to the maximum. That is, this may be referred to as radiation resistance test conditions of the detector 32.

Figure 5A:
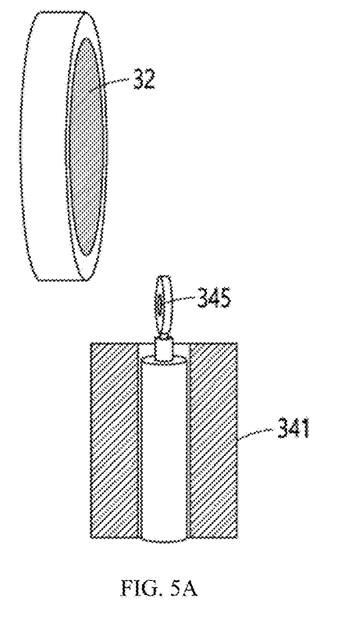
FIGS. 5A and 5B show the configuration of a first sensor according to one embodiment of the present disclosure.
Figure 5B:
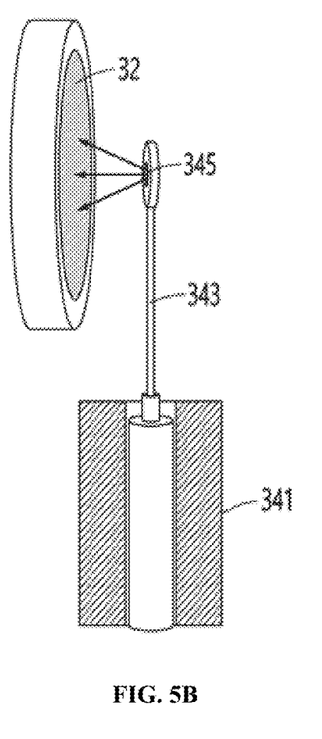
Figure 6A:
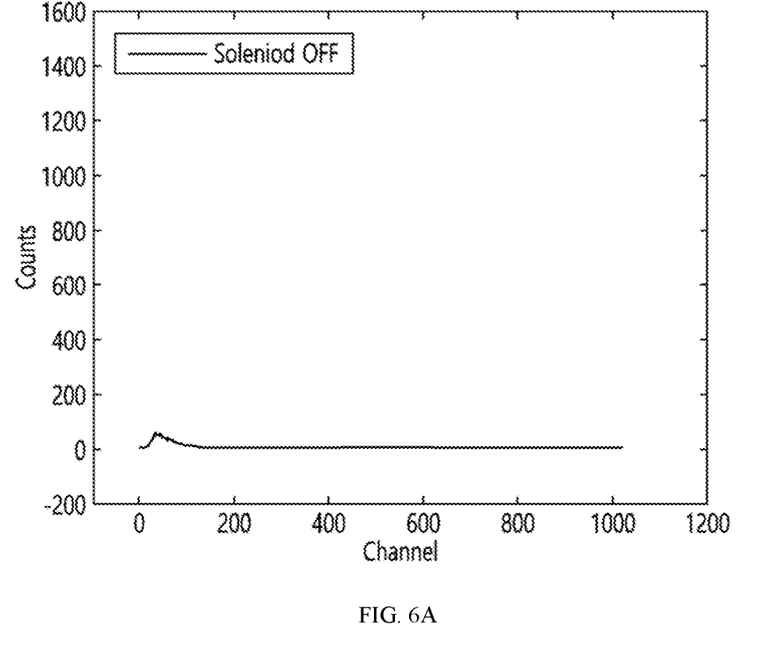
FIGS. 6A and 6B are graphs showing a radiation energy spectrum by a check source according to power on/off of a driver according to one embodiment of the present disclosure.
Figure 6B:
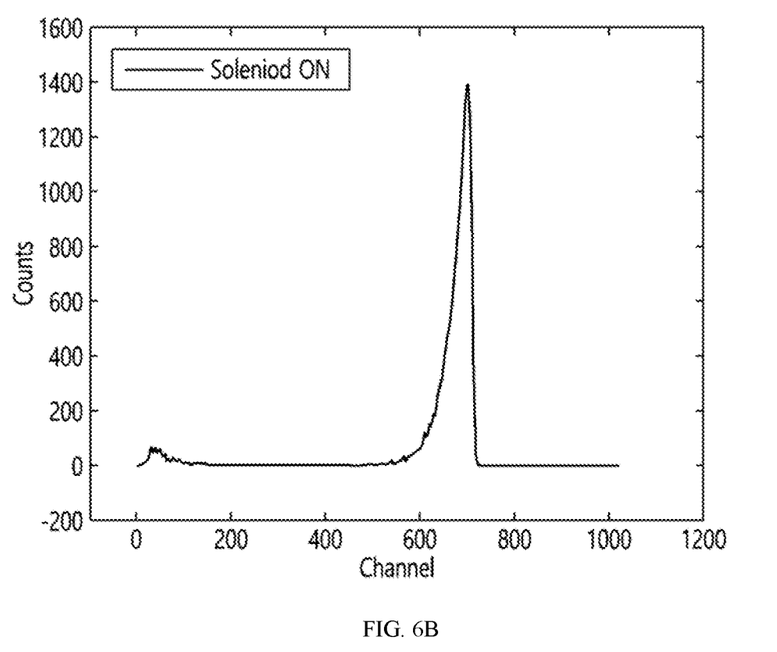

FIGS. 5A and 5B show the configuration of a first sensor according to one embodiment of the present disclosure, and FIGS. 6A and 6B are graphs showing a radiation energy spectrum by a check source according to power on/off of a driver according to one embodiment of the present disclosure.

In addition, a signal detected in a state in which the performance of the detector 32 is deteriorated is unreliable. To prevent such a problem, the inspector 34 monitors the integrity of the detector 32. The inspector 34 includes a driver 341 and a check source 345.

Referring to FIGS. 5A and 5B, the driver 341 serves to move the check source 34. In one embodiment of the present disclosure, the driver 341 is a solenoid actuator. The driver 341 is preferably minimally affected by radiation. A rod 343 is coupled to the driver 341. In a state in which power is not applied to the driver 341, the rod 343 is positioned within the driver 341 (see FIG. 5A). When power is applied to the driver 341, the rod 343 rises (see FIG. 5B). The driver 341 is configured to be remotely operated by an operator in a main control room or the like. Through this, it may be checked whether the detector 32 is operating normally even during operation of a nuclear power plant.

The check source 345 is formed on the rod 343. Since the radiation emission rate of the check source 345 should not change for a long time, a long half-life nuclide is preferably used as the check source 345. In one embodiment of the present disclosure, as the check source 345, Am-241 with a half-life of about 432 years is used. In addition, to reliably distinguish the check source and a signal generated due to background radiation, high-energy radiation in which a signal is formed in a relatively high channel is preferably used as the check source. A suitable radiation type for this is alpha rays.

When power is not applied to the driver 341, radiation emitted from the check source 345 is not detected by the detector 32, which is referred to as a monitoring release position. When power is applied to the driver 341, radiation emitted from the check source 345 is detected by the detector 32, which is referred to as a monitoring position. That is, the check source 345 may move between a monitoring position and a monitoring release position according to power on/off of the driver 341.

FIG. 6A shows a radiation energy spectrum detected by the detector 32 by the check source 345 in a state in which power is not applied to the driver 341, and FIG. 6B shows a radiation energy spectrum detected by the detector 32 by the check source 345 in a state in which power is applied to the driver 341. In the graphs of FIGS. 6A and 6B, the horizontal axis represents a channel corresponding to energy, and the vertical axis represents count values.

As shown in FIG. 6B, it can be seen that, when power is applied to the driver 341, radiation is counted in a specific number of channels. That is, by operating the driver 341, it is possible to know the detection performance of the detector 32 and whether the detector 32 operates normally.

The discriminator 40 determines whether the coolant (C) is leaking based on a radiation measurement signal. To perform this function, the discriminator 40 is connected to the detector 32 to receive a radiation measurement signal. The discriminator 40 acquires a radiation energy spectrum from a radiation measurement signal, and determines whether the coolant (C) is leaking based on the radiation energy spectrum.

More specifically, the discriminator 40 includes a lower level discriminator (LLD) for removing radiation measurement signals generated at energy lower than preset energy. The lower level discriminator removes signals generated in channels lower than the beta ray energy of $^{16}N$ among radiations. Accordingly, when a beta-ray measurement signal over a specific channel is detected, the discriminator 40 may determine that the coolant (C) has leaked from a nuclear reactor.

Figure 7:
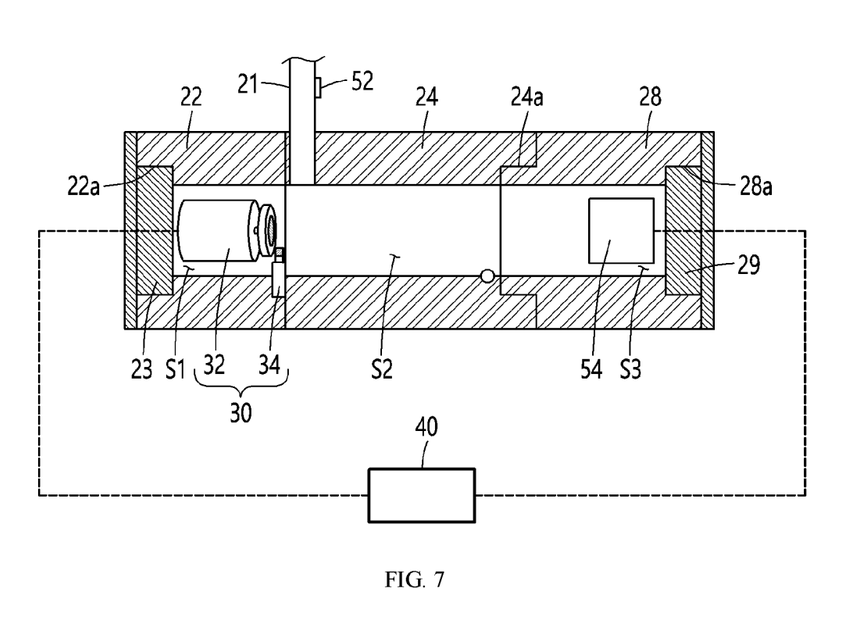
FIG. 7 schematically illustrates the configuration of an apparatus for detecting nuclear reactor coolant leaks according to another embodiment of the present disclosure.

FIG. 7 schematically illustrates the configuration of an apparatus for detecting nuclear reactor coolant leaks according to another embodiment of the present disclosure.

An apparatus for detecting nuclear reactor coolant leaks according to another embodiment of the present disclosure further includes a second sensor for detecting additional information to determine the leakage of the coolant (C) in addition to a radiation measurement signal by the detector 32. Here, additional information is various information capable of determining the leakage of the coolant (C), and includes temperature or humidity.

The second sensor senses additional information about the sample air (A), and includes a sensor 52 and a transmitter 54.

The sensor 52 senses temperature or humidity information of the sample air (A). To sense temperature or humidity information of the sample air (A), the sensor 52 is preferably in direct contact with steam. Accordingly, in another embodiment of the present disclosure, the sensor 52 is installed on the inlet pipe 21. However, the installation location of the sensor 52 is not limited.

The transmitter 54 converts information of the sensor 52 into an electrical signal. In another embodiment of the present disclosure, the transmitter 54 is disposed in the internal space of the shield 20. However, the transmitter 54 needs to be disposed in an independent space so as not to be affected by change in internal and external environments in the internal space of the shield 20.

Referring to FIG. 7, unlike one embodiment, in the apparatus for detecting nuclear reactor coolant leaks according to another embodiment of the present disclosure, the internal space of the shield 20 is further formed. That is, in the internal space of the shield 20, a first space (S1) is a space in which the first sensor 30 is disposed, a second space (S2) is a space into which the sample air (A) is introduced, and a third space (S3) is a space in which the transmitter 54 is disposed.

For this configuration, the shield 20 according to another embodiment of the present disclosure is formed in a detachable structure so that the internal space of the shield 20 may be expanded. That is, according to the present disclosure, the structure of the shield 20 may be flexibly changed.

The shield 20 according to another embodiment of the present disclosure includes the first body 22, the second body 24, and a third body 28. Since description of the first body 22 and the second body 24 is the same as described above, detailed description thereof will be omitted.

The third body 28 has a hollow cylindrical shape, and thus an internal space (S3) is formed therein. One side (the left side of the third body shown in FIG. 7) of the third body 28 is coupled to the second body 24, and an opening is formed on the other side of the third body 28. In this case, an opening formed on one side of the third body 28 is formed to be blocked. In addition, according to another modified example, to widen the second space (S2), the opening formed on one side of the third body 28 may be formed so as not to be blocked.

One side of the third body 28 is coupled to the other side of the second body 24. The opening formed on the other side of the third body 28 is closed by a third body closing barrier 29. Joint portions where one side of the third body 28 and the second body 24 contact each other and joint portions where the other side of the third body 28 and the third body closing barrier 29 contact each other may be implemented in various joint types, such as a screw-type joint and a protrusion-type joint. The joint portions may be sealed by a sealing material.

In addition, in another embodiment of the present disclosure, only three bodies 22, 24, and 28 are shown. However, four or more bodies may be configured according to use, and a plurality of bodies may be removed when necessary.

In addition, as shown in FIG. 7, the stepped structures 28a may be formed at both ends of the third body 28, respectively. As described above, when a stepped structure 24a is formed at the other end of the second body 24, the second body 24 is coupled to the third body 28 via a stepped structure-mediated manner. In addition, the third body closing barrier 29 has a shape that fits into the stepped structure 28a formed at the other end of the third body 28, and is coupled to the third body 28 via a stepped structure-mediated manner. In FIG. 7, one stepped structure 28a is formed at each end of the third body 28, and as will be described later, the number of the stepped structures 28a is not limited. When the stepped structures 28a are formed in this way, background radiation in a nuclear reactor is difficult to penetrate into the internal space of the shield 20, and radiation inside the shield 20 is difficult to be exposed to the outside.

The discriminator 40 is connected to the transmitter 54. Accordingly, in addition to radiation measurement signals detected by the detector 32, the discriminator 40 may use additional information sensed by the sensor 52, and thus reliability for determining whether the coolant (C) leaks may be improved.

Figure 8:
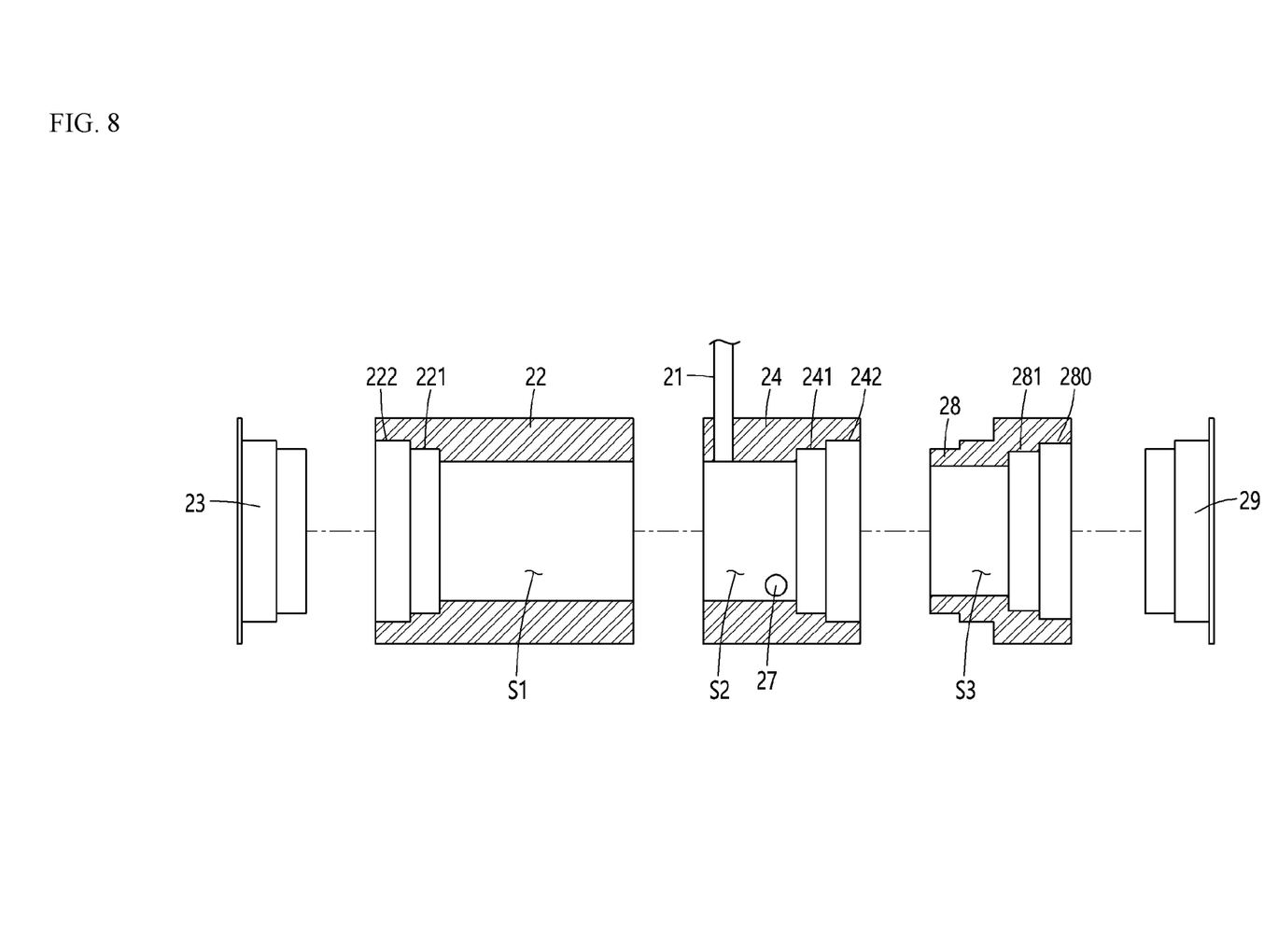
FIG. 8 illustrates the configuration of a shield according to another embodiment of the present disclosure.

FIG. 8 illustrates the configuration of a shield according to another embodiment of the present disclosure.

FIG. 8 shows the shield 20 having a detachable structure in a separated state. At one end of the first body 22, two stepped structures 221 and 222 are formed so that the first body 22 is coupled to the first body closing barrier 23 via a stepped structure-mediated manner. At the other end of the second body 24, two stepped structures 241 and 242 are formed so that the second body 24 is coupled to the third body 28 via a stepped structure-mediated manner. At the other end of the third body 28, two stepped structures 281 and 282 are formed so that the third body 28 is coupled to the third body closing barrier 29 via a stepped structure-mediated manner. However, as described above, the number of stepped structures formed at each of the bodies 22, 24, and 28 is not limited.

In addition, according to another embodiment, at one end or both ends of each of the bodies 22, 24, and 28, various shapes such as an inclined shape and a curved shape may be formed instead of stepped structures.

<Method of Detecting Nuclear Reactor Coolant Leaks>

A method of detecting nuclear reactor coolant leaks according to the present disclosure having the above-described configuration will be described.

The method of detecting nuclear reactor coolant leaks according to the present disclosure includes a suction step, a collection step, a first detection step, a monitoring step, a second detection step, and a determination step.

The suction step is a step of sucking the coolant (C) leaked from the primary coolant system pipe of a nuclear reactor into the sample air (A). In the suction step, the high-humidity sample air (A) generated by vaporization of the coolant (C) is collected through the collection pipe 11, and the sample air (A) collected by the collection pipe 11 is transferred toward the shield 20.

The collection step is a step of collecting the sample air (A) sucked in the suction step into a shielded space. The sample air (A) is introduced into the internal space of the shield 20 through the inlet pipe 21 to measure the radiation of the sample air (A). When radiation measurement is completed, the sample air (A) may be discharged to the outside through the discharge pipe 27.

The first detection step is a step of detecting a radiation measurement signal from the sample air (A) collected in the collection step. In one embodiment of the present disclosure, the beta rays of $^{16}$N included in the coolant (C) are detected by the detector 32.

The monitoring step is a step of frequently monitoring the radiation detection performance of the detector 32 to confirm the integrity of the detector 32. The monitoring step may be controlled remotely by an operator.

The second detection step is a step of detecting additional information necessary to determine whether the coolant (C) leaks from the sample air (A) sucked in the suction step. In this case, the additional information includes the temperature or humidity information of the sample air (A). To detect additional information, the sensor 52 and the transmitter 54 are formed. The function of each configuration is as described above.

In addition, the sample air (A) sucked in the suction step, the detector 32 operating in the first detection step, and the transmitter 54 operating in the second detection step are separately formed in an independent space in the shield 20.

The determination step is a step of determining, based on the radiation measurement signal and the additional information, whether the coolant (C) is leaking. In the determination step, the discriminator 40 determines that the coolant (C) has leaked when a measurement signal greater than preset energy is detected by removing measurement signals generated at energy lower than the preset energy by using a lower level discriminator. That is, the discriminator 40 determines whether the coolant (C) leaks from a nuclear reactor by analyzing the degree of radionuclide reduction in the coolant (C). In addition, since the discriminator 40 further considers additional information, the reliability of determining whether the coolant (C) is leaking is improved. In addition, the discriminator 40 may also determine the occurrence location of the coolant (C) leakage.

The present disclosure has the following effects.

First, since the sample air (A) of the leaked coolant (C) is collected, the accuracy of radiation measurement can be improved, and nuclear reactor coolant leaks can be detected in real time.

Second, to remove the influence of high-dose background radiation generated during operation of a nuclear power plant, a shielding structure for detecting radiation is formed, and a radiation detector having radiation-resistant performance is configured. Accordingly, radiation detection integrity can be maintained.

Third, since a space for collecting the sample air (A) and a space in which a detector is installed are physically separated, the detector is prevented from being physically or chemically damaged by contact with a coolant.

Fourth, since a shield is formed in a detachable structure, an internal space can be expanded according to needs and uses, so that the flexibility of a shield structure can be improved.

Fifth, in addition to radiation measurement signals, temperature or humidity information is further considered to determine whether a coolant leaks. Accordingly, the reliability of coolant leak determination can be ensured.

Sixth, even when a small amount of coolant leaks, it can be determined whether the coolant leaks in a shielding structure by collecting the sample air (A).

Although the present disclosure has been described with reference to one embodiment shown in the accompanying drawings, this is only exemplary, and those skilled in the art can understand that various modifications and variations are possible from the above description. Accordingly, the scope of protection of the present disclosure should be defined by the following claims.

[Description of Symbols]

| | |
|---|---|
| 10: SUCKER | 11: COLLECTION PIPE |
| 11A: COLLECTION HOLES | 12: AIR INJECTOR |
| 20: SHIELD | 21: INLET PIPE |
| 22: FIRST BODY | 22A: STEPPED STRUCTURE |
| 23: FIRST BODY CLOSING BARRIER | 24: SECOND BODY |
| 24A: STEPPED STRUCTURE | 25: SECOND BODY CLOSING BARRIER |
| 27: DISCHARGE PIPE | 28: THIRD BODY |
| 28A: STEPPED STRUCTURE | 29: THIRD BODY CLOSING BARRIER |
| 30: FIRST SENSOR | 32: DETECTOR |
| 34: INSPECTOR | 52: SENSOR |
| 54: TRANSMITTER | 221, 222, 281, 282: STEPPED STRUCTURE |
| 341: DRIVER | 343: ROD |
| 345: CHECK SOURCE | |

What is claimed is:

1. An apparatus for detecting nuclear reactor coolant leaks, comprising:
   a shield
      having an internal space
         configured to allow sample air containing a coolant leaking from a primary coolant system pipe of a nuclear reactor to be introduced,
         and configured to close the internal space or expand the internal space through detachable coupling;
   a collection pipe
      provided to be located in a same area as the primary coolant system pipe and having a plurality of collection holes formed on an outer peripheral surface of the collection pipe in a longitudinal direction thereof,
         wherein the collection pipe allows the coolant to be introduced into at least one collection hole among the plurality of collection holes;
   a sensor disposed in the internal space, wherein the sensor is configured to detect and count a radiation from the sample air containing the coolant leaking from the primary coolant system pipe
      and obtain a radiation signal from the radiation; and
   a discriminator for determining, based on the radiation signal, whether the coolant is leaking,
   wherein the shield comprises:
      an inlet pipe connected to the collection pipe through which the sample air is introduced into the internal space; and
      a discharge pipe through which the sample air located in the internal space is discharged outside,
   wherein a time for the sample air containing the coolant to reach the shield varies according to locations of the plurality of collection holes, such that a count rate at a time of detecting the radiation changes according to a location of the at least one collection hole into which the coolant is introduced, and
      wherein the discriminator is configured to determine, based on a change in the count rate according to the locations of the plurality of collection holes, a leakage location of the coolant of the primary coolant system pipe.

2. The apparatus according to claim 1, wherein, a first space of the internal space is a space into which the sample air is introduced and a second space of the internal space is a space in which the sensor is disposed.

3. The apparatus according to claim 1, wherein the shield comprises bodies each having an opening formed on one side thereof; and body closing barriers for closing the openings.

4. The apparatus according to claim 3, wherein the bodies are coupled to each other via a stepped structure.

5. The apparatus according to claim 3, wherein a stepped structure is formed at one end of each of the bodies.

6. The apparatus according to claim 1, wherein the sensor comprises:
   a detector for detecting radiation; and
   an inspector for monitoring radiation detection performance of the detector.

7. The apparatus according to claim 6, wherein the detector is a silicon semiconductor detector.

8. The apparatus according to claim 6, wherein the inspector comprises a rod; a driver for driving the rod; and a check source formed on the rod to radiate radiation.

9. The apparatus according to claim 8, wherein
   the driver is a solenoid actuator, and
   the check source is capable of moving between a monitoring position and a monitoring release position.

10. The apparatus according to claim 1, wherein the sensor is a first sensor, and
   wherein the apparatus further comprises a second sensor configured to detect additional information about the sample air so that the discriminator determines whether a coolant leaks.

11. The apparatus according to claim 10,
   wherein the second sensor is configured to sense temperature or humidity information of the sample air, and
   wherein the second sensor comprises a transmitter located in the internal space to convert the temperature or humidity information sensed by the second sensor into an electrical signal.

12. The apparatus according to claim 11, wherein the internal space comprises first to third spaces physically separated from each other,
   the first sensor is disposed in the first space,
   the second space is a space into which the sample air is introduced, and
   the transmitter is disposed in the third space.

* * * * *